Oct. 1, 1935.   L. A. ELLIS   2,016,081
BAIL
Filed Nov. 3, 1934   2 Sheets-Sheet 1
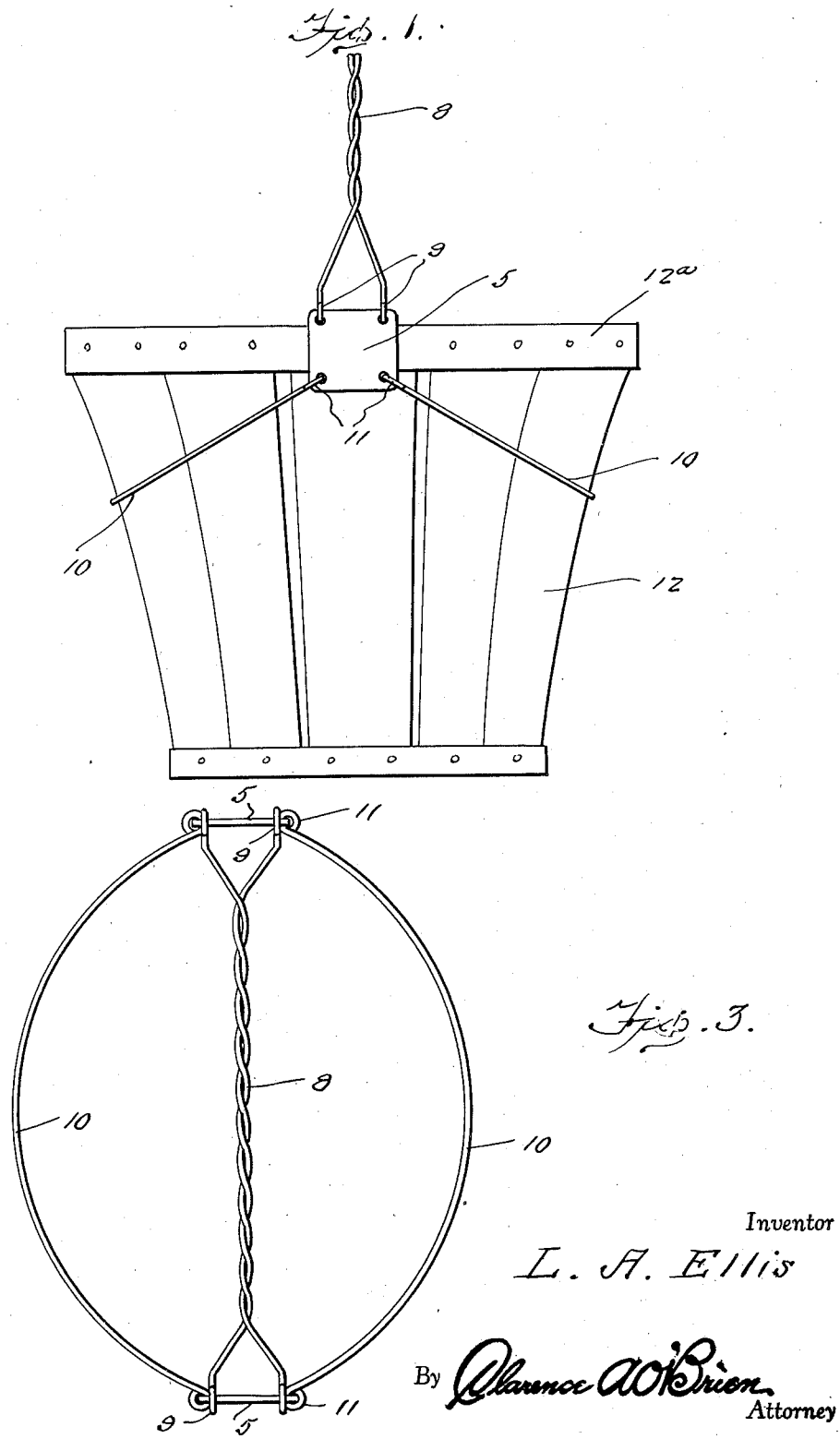
Inventor
L. A. Ellis
By Clarence A. O'Brien
Attorney

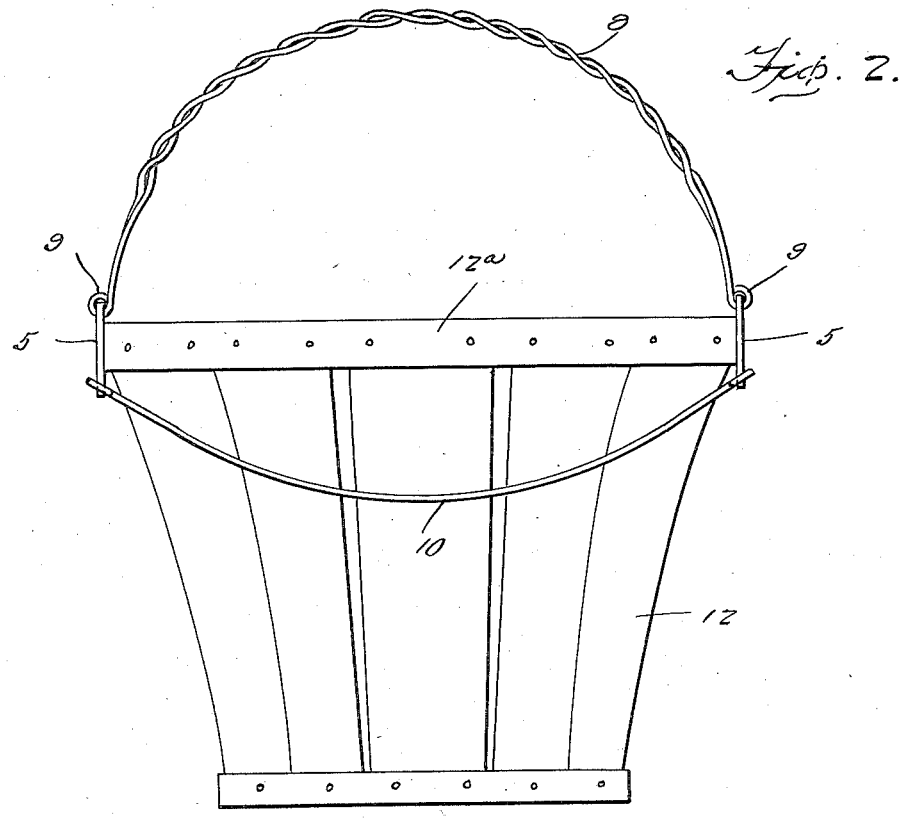
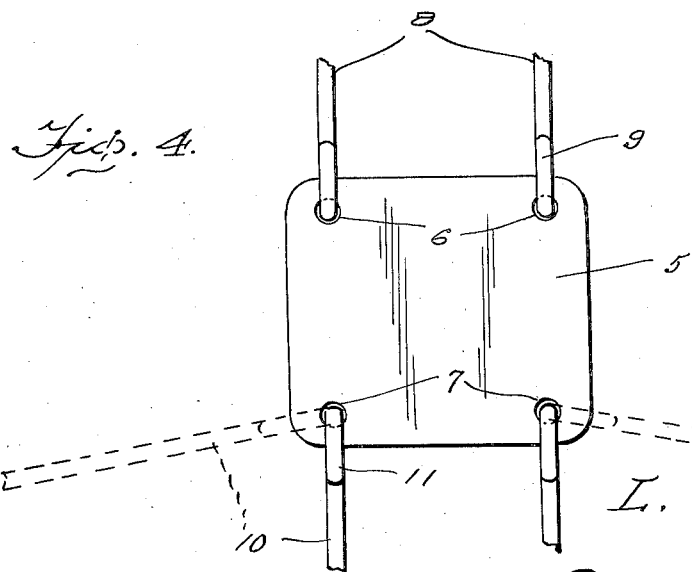

Patented Oct. 1, 1935

2,016,081

UNITED STATES PATENT OFFICE 2,016,081

BAIL

Lambert A. Ellis, Laurel, Del.

Application November 3, 1934, Serial No. 751,377

2 Claims. (Cl. 217—125)

This invention relates to what may be termed a bail, and has as its object to provide a device of this character especially adapted for carrying fruit baskets and the like.

An object of the invention is to provide a detachable bail that may be readily associated with a fruit basket to facilitate the handling and carrying of the basket when full and which will so engage the basket as not to tend to separate the upper rim from the peripheral wall of the basket as is now the main objection to devices provided at the present time for use as handles or bails for fruits and similar baskets or receptacles.

The invention together with its objects and advantages will be best understood from a study of the following description taken in connection with the accompanying drawings, wherein:

Figure 1 is an elevational view illustrating the application of the invention.

Figure 2 is an elevational view taken at right angles to Figure 1.

Figure 3 is a top plan view of the bail.

Figure 4 is a fragmentary elevational view illustrating certain details of construction to be hereinafter more fully referred to.

Referring to the drawings by reference numerals it will be seen that the improved bail comprises a pair of plates 5 of metal or other suitable material provided adjacent the corners thereof with apertures 6 and 7. A pair of handle members 8 formed of wire or other suitable material have their intermediate portions relatively twisted about one another and their end portions spread in opposite direction, passed through the apertures 6 in the plate 5 and bent upon themselves to provide eyes 9 whereby the ends of the handle forming members 8 are loosely engaged with the plates 5. A pair of complemental basket engaging members 10 preferably formed from single strands of wire or the like are bent or curved longitudinally and have their free ends reversely bent to form eyes 11 engaging the openings 7 in the plates 5 as shown in Figures 3 and 4.

In actual practice, the members 10 are slipped over the basket or similar receptacle 12 so as to engage the walls of the basket 12 at diametrically opposite sides of the basket as shown in Figures 1 and 2. The handle forming members 8 will thus extend across the top of the basket and with the basket 12 weighed down by its contents, the members 10 will be caused to frictionally grip the walls of the basket below the rim 12a of the basket and out of intimate contact with said rim thus permitting the basket to be easily lifted and carried in one hand. The members 10 remaining out of engagement with the rim 12a no strain whatever will be placed on the rim 12a and consequently the danger of the rim 12a pulling away from the straps forming the wall of the basket 12 will be eliminated. Hence, with a bail of this character, the life of the basket 12 will not be shortened to any material extent, if at all, and will tend to increase the life of the basket.

It will also be apparent that a bail or carrier of this character can be cheaply and economically constructed and will be practical and efficient in use. Also with such a bail or carrier a basket of any size may be easily carried about and one may carry two baskets with ease, one in each hand.

Having thus described the invention what is claimed as new is:

1. A bail or carrying member for baskets and analogous receptacles comprising a pair of apertured plates, longitudinally curved wire jaw members having eyes formed at the end thereof engaging apertures in said plates, and a handle comprising a pair of wire members having intermediate portions relatively twisted together and end portions provided with eyes engaging additional apertures in said plates.

2. A bail for fruit baskets and analagous receptacles comprising a pair of opposed substantially square plates, each plate having an eye adjacent each corner thereof, a pair of arcuate jaw members connecting said plates and having ends engaging the apertures adjacent the lower corners of the plates, and a handle comprising a pair of wire members having intermediate portions relatively twisted together and diverging end portions engaging the apertures in the upper corners of said plates.

LAMBERT A. ELLIS.